(12) United States Patent
Kitajima et al.

(10) Patent No.: US 6,702,214 B2
(45) Date of Patent: Mar. 9, 2004

(54) FISHING-REEL POWER TRANSMISSION DEVICE

(75) Inventors: Keigo Kitajima, Sakai (JP); Koji Takikura, Izumi (JP); Taisei Morise, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 10/337,284

(22) Filed: Jan. 7, 2003

(65) Prior Publication Data

US 2003/0146322 A1 Aug. 7, 2003

(30) Foreign Application Priority Data

Feb. 4, 2002 (JP) ........................................ 2002-026848

(51) Int. Cl.$^7$ ............................................... A01K 89/01
(52) U.S. Cl. ........................................ 242/249; 242/263
(58) Field of Search ............................. 242/249, 255, 242/263

(56) References Cited

U.S. PATENT DOCUMENTS

| | | | |
|---|---|---|---|
| 3,284,020 A | | 11/1966 | Policansky |
| 4,796,831 A | | 1/1989 | Sheppard |
| 5,110,066 A | * | 5/1992 | Toda ........................... 242/255 |
| 5,178,343 A | * | 1/1993 | Sato ............................ 242/255 |
| 6,325,315 B1 | * | 12/2001 | Chang ......................... 242/255 |
| 6,382,543 B1 | * | 5/2002 | Chang ......................... 242/249 |
| 6,394,380 B2 | * | 5/2002 | Takikura ...................... 242/279 |

FOREIGN PATENT DOCUMENTS

| | | |
|---|---|---|
| DE | 4315955 A1 | 11/1993 |
| EP | 1155613 A1 | 11/2001 |
| GB | 645978 | 11/1950 |
| JP | 2001-321041 | 11/2001 |

* cited by examiner

*Primary Examiner*—Emmanuel Marcelo
(74) *Attorney, Agent, or Firm*—Shinjyu Global IP Counselors, LLP (57) ABSTRACT

A power transmission mechanism is for transmitting power from a handle of a spinning reel to an oscillating mechanism, and includes a pinion gear, a dual-stepped gear, and a driven gear. The pinion gear rotates in cooperation with rotation of the handle. The dual-stepped gear has a larger-diameter gear that is a helical-tooth gear and meshes with the pinion gear, and a smaller-diameter gear that is arranged coaxially with the larger-diameter gear and is formed unitarily with the larger-diameter gear. The smaller-diameter gear is a straight-tooth gear or a helical gear whose orientation is substantially the same as an orientation of the larger gear. The driven gear meshes with the smaller-diameter gear to rotate the oscillating mechanism. In a power transmission device in a fishing reel, manufacturing cost is reduced while suppressing noise.

15 Claims, 10 Drawing Sheets

FISHING-REEL POWER TRANSMISSION DEVICE

BACKGROUND OF THE INVENTION

1. Field of the Invention

This invention generally relates to power transmission devices. More specifically, the present invention relates to fishing reel power transmission devices in a fishing reel, in which power is transmitted from a first member that rotates to a second member.

2. Background Information

Fishing reels often employ a power transmission device including a dual-stepped gear in which a larger-diameter gear and a smaller-diameter gear are arranged coaxially.

For example, a level wind mechanism in a dual-bearing reel uses a power transmission device having: a drive gear mounted to a spool shaft; a dual-stepped gear mounted rotatably to a side face of a side plate of the reel unit and having a larger-diameter gear that meshes with the drive gear; and a driven gear that is attached to a worm gear of the level wind mechanism and meshes with the smaller-diameter gear of the dual-stepped gear. In the dual-stepped gear employed in the dual-bearing reel, both the larger-diameter gear and the smaller-diameter gear are straight-tooth gears; they have a construction that can be easily formed unitarily from a resin, and the manufacturing cost can be easily reduced.

The oscillating mechanism in a spinning reel employs, as disclosed in Japanese Unexamined Patent Publication No. 2001-321041, a power transmission device having a pinion gear, which serves as a drive gear for rotating the rotor, a dual-stepped gear the larger-diameter gear of which meshes with the pinion gear, and a driven gear that meshes with the smaller-diameter gear of the dual-stepped gear. Both the larger-diameter gear and the smaller-diameter gear of the dual-stepped gear employed in the spinning reel are helical-tooth gears (screw gears) and the helical teeth are oriented in different directions. Generally, the use of helical-tooth gears can suppress noise when rotating. In particular, when a gear meshes with a gear made of metal, such as a pinion gear, the use of a synthetic resin instead of metal can further suppress noise. However, if the orientations of helical teeth are different, it is difficult to form the dual-stepped gear integrally by molding. For this reason, the dual-stepped gear is usually manufactured by joining two gears that have been separately molded or gear-cut.

When the two gears are straight-tooth gears in the foregoing conventional configuration, it is difficult to suppress noise, although the manufacturing cost can be reduced since they can be formed unitarily. On the other hand, when the larger-diameter gear and the smaller-diameter gear have helical teeth and the orientations of the helical teeth are different, it is difficult to reduce the manufacturing cost since two gears that have been separately molded or gear-cut need to be joined, although the noise can be suppressed.

In view of the above, there exists a need for a power transmission device which overcomes the above mentioned problems in the prior art. This invention addresses this need in the prior art as well as other needs, which will become apparent to those skilled in the art from this disclosure.

SUMMARY OF THE INVENTION

It is a purpose of the present invention to reduce the manufacturing cost while suppressing noise in a fishing-reel power transmission device.

A fishing-reel power transmission device according to the first aspect of the present invention is a device for transmitting power from a first rotating member to a second member in a fishing reel. The fishing-reel power includes a drive gear, a dual-stepped gear, and a driven gear. The drive gear rotates in cooperation with the first member. The dual-stepped gear has a first gear portion that is a helical-tooth gear and meshes with the drive gear, and a second gear portion that is arranged coaxially with the first gear portion and is formed unitarily with the first gear portion as a one-piece unitary member. The second gear portion has one of a straight-tooth gear and a helical-tooth gear having a gear specification such that the lead angle thereof according to which a mold is rotated when molding substantially matches the lead angle of the first gear. The driven gear meshes with the second gear portion of the dual-stepped gear and rotates the second member.

In this power transmission mechanism, as the first member rotates, the drive gear is rotated and the rotation thereof is transmitted to the first gear portion and further from the second gear portion to the driven gear, which then rotates the second member. The first gear of the dual-stepped gear is a helical-tooth gear while the second gear is either a straight-tooth gear or a helical-tooth gear. Where the second gear is the helical-tooth gear, if the orientations of the first and second gear portions are substantially the same, more preferably if the specification thereof is determined such that the lead angles according to which a mold is rotated when molding the first gear portion and the second gear portion substantially match each other, the two gear portions can be simultaneously molded in a single metal mold. Specifically, the lead angles can be represented as follows; the lead angle for the first gear portion is $\tan \alpha/d1$ and that for the second gear portion is $\tan \beta/d2$, where the diameters of the pitch circles of the first and the second gear portions are $d1$ and $d2$, respectively, and the helical-tooth angles are $\alpha$ and $\beta$, respectively. The specification for each gear portion should be decided so that these lead angles match each other. Here, preferably, the pitch circle diameters $d1$ and $d2$ are determined from the normal modules $M1$ and $M2$ and the numbers of teeth $Z1$ and $Z2$ of the respective teeth of the gears, as follows: $d1=M1 \times Z1/\cos \alpha$ and $d2=M2 \times Z2/\cos \beta$, respectively. Thus, if the specifications of the gears are designed such that the following equation holds: $M1 \times Z1/\sin \alpha = M2 \times Z2/\sin \beta$, the lead angles of the two gear portions match each other. By determining the specifications of the two gear portions in such a manner or by making the second gear portion have straight teeth, a dual-stepped gear in which two gear portions are formed unitarily by molding can be easily obtained at low cost. Consequently, in a fishing-reel power transmission device, when both of the gear portions are configured to have helical teeth, the manufacturing cost can be reduced irrespective of the material while suppressing noise. On the other hand, when the second gear portion is configured to have straight teeth, the manufacturing cost can be reduced while suppressing noise by forming the dual-stepped gear of a synthetic resin.

According to the second aspect of the invention, the fishing-reel power transmission device is provided as set forth in the first aspect, in which the dual-stepped gear is made of a synthetic resin. In this case, since the dual-stepped gear is made of a synthetic resin, noise can be suppressed even when the drive gear and the driven gear are made of metal. In addition, noise can be suppressed even when the second gear portion has straight teeth.

According to the third aspect of the invention, the fishing-reel power transmission device is provided as set forth in the first or second aspect, in which the first gear portion has a larger diameter than does the second gear portion. In this case, since the first gear portion, which meshes with the first member, has a larger diameter than the second gear portion, the speed of the rotation of the first member can be reduced by the dual-stepped gear when the rotation is transmitted to the second member.

According to the fourth aspect of the invention, a fishing-reel power transmission device is provided as set forth in any one of first through third aspects, in which the drive gear is made of metal; and the driven gear is made of a synthetic resin. In this case, even when the drive gear is made of metal, noise can be suppressed because the first gear portion, which meshes with it, has helical teeth, and at the same time, even when the second gear has straight teeth, noise can be suppressed because the driven gear is made of a synthetic resin.

According to the fifth aspect of the invention, a fishing-reel power transmission device is provided as set forth in the fourth aspect, in which the second gear portion and the driven gear are straight-tooth gears. In this case, the dual-stepped gear can be easily molded since second gear portion is a straight-tooth gear.

According to the sixth aspect of the invention, a fishing-reel power transmission device is provided as set forth in any one of the first through fifth aspects, in which the number of teeth of the drive gear is less than the number of teeth of the first gear portion, and the number of teeth of the second gear portion is less than the number of teeth of the driven gear. In this case, a great reduction in speed is possible from the drive gear toward the driven gear.

According to seventh aspect of the invention, a fishing-reel power transmission device is provided as set forth in any one of first through sixth aspects, in which the fishing reel being a spinning reel in which the second member that is a rotor being mounted rotatably to a reel unit and being for guiding a fishing line rotates in cooperation with rotation of the first member that is a handle and a spool to which the fishing line is wound reciprocates back and forth in cooperation with rotation of the handle, wherein: the drive gear is a pinion gear to which the rotor is mounted non-rotatably and that meshes with a master gear provided on a rotation shaft of the handle; the driven gear is provided for an oscillating mechanism for reciprocating the spool back and forth; and the first gear portion meshes with the pinion gear.

In this case, when the device is used as a device for decelerating a traverse cam type oscillating mechanism of a spinning reel also, it is possible to reduce the manufacturing cost while suppressing noise.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Overall Configuration and Reel Unit Configuration

Figure 1:
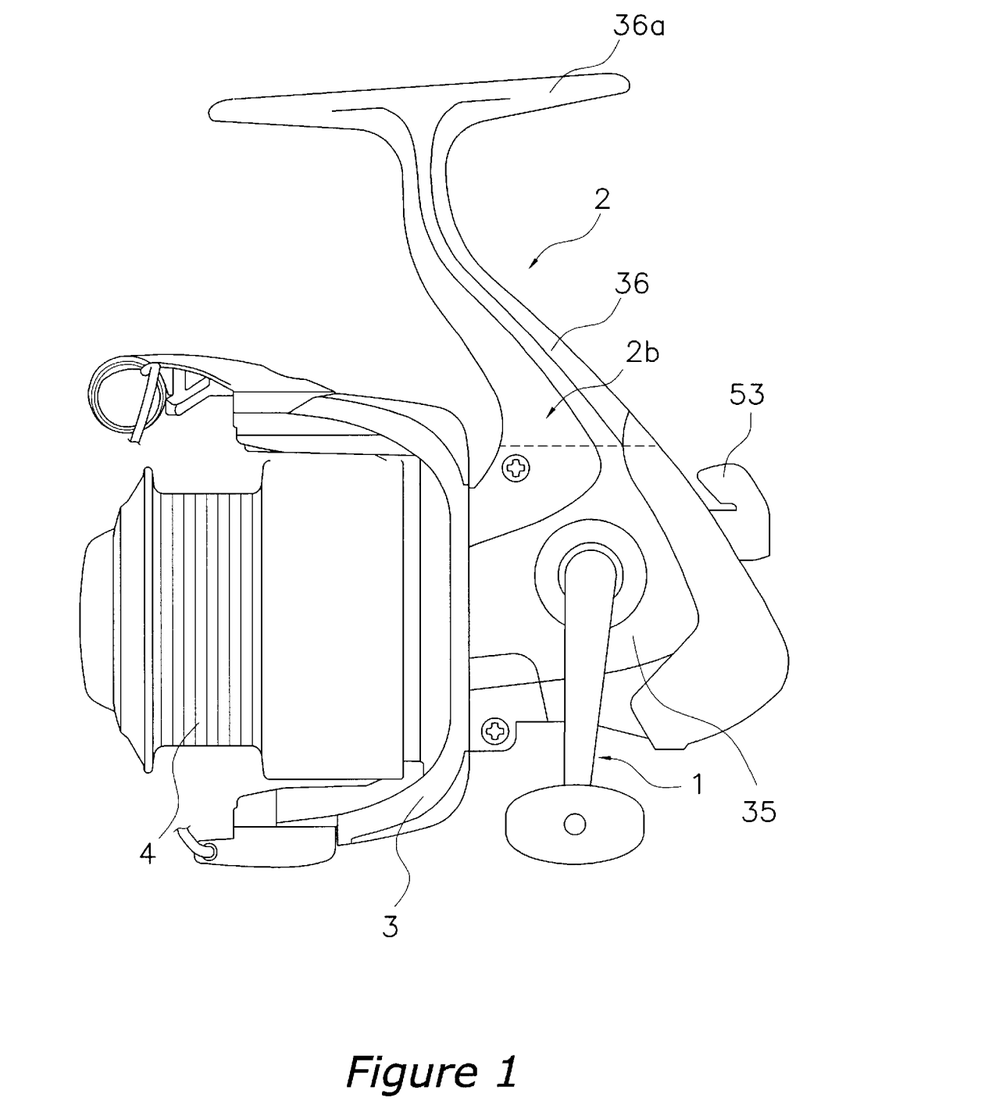
FIG. 1 is a side view of a spinning reel according to an embodiment of the present invention.
Figure 2:
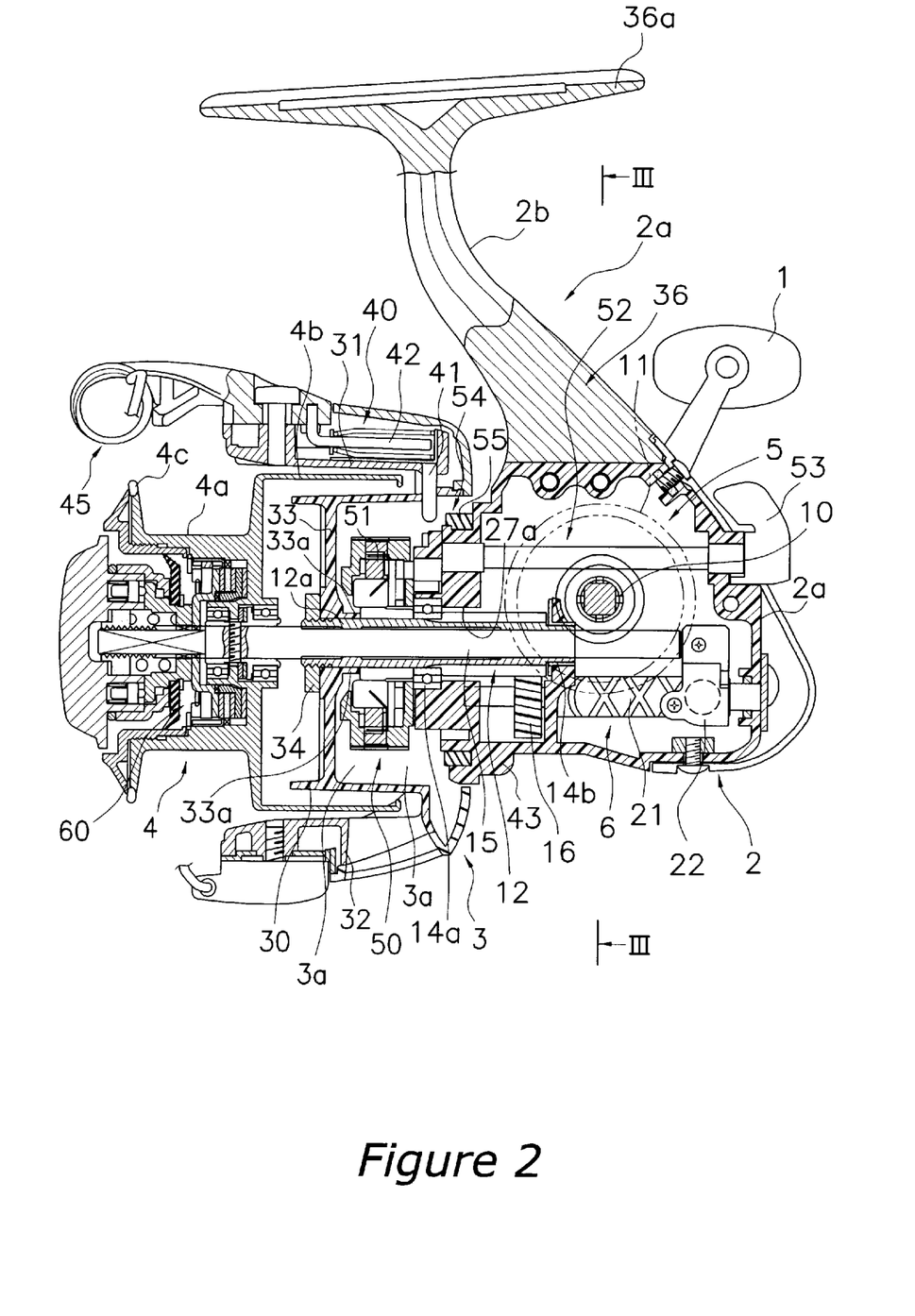
FIG. 2 is a side cross-sectional view of the spinning reel according to the embodiment of the present invention.

As shown in FIGS. 1 and 2, a spinning reel in accordance with one embodiment of the present invention includes a handle 1, a reel unit 2 that is to be mounted to a fishing rod and rotatably supports the handle 1, a rotor 3, and a spool 4. The rotor 3 is for winding a fishing line on the spool 4 and is rotatably supported at the front of the reel unit 2. The spool 4 is for winding a fishing line on the outer periphery thereof, and is arranged at the front of the rotor 3 so that it can be shifted back and forth. It should be noted that the handle 1 can be attached to the left side of the reel unit 2 as shown in FIG. 1, or to the right side of the reel unit 2 as shown in FIG. 2.

As shown in FIGS. 1 through 7, the reel unit 2 principally includes: a casing 2a that supports the rotor 3 and the spool 4; a lid portion 2b detachably screwed fast to the casing 2a; and a circular flange portion 2c having a first flange portion 24a formed unitarily with the casing 2a and a second flange portion 24b formed unitarily with the lid portion 2b.

Figure 3:
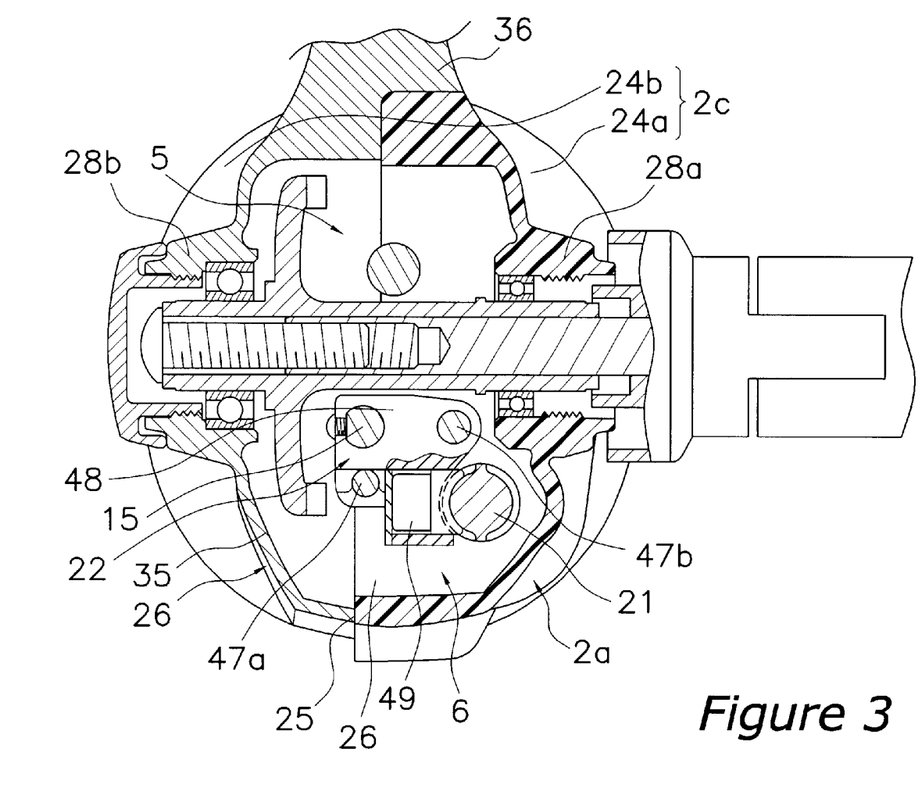
FIG. 3 is a cross-sectional view of the spinning reel according to the embodiment of the present invention viewed along line III—III of FIG. 2.
Figure 4:
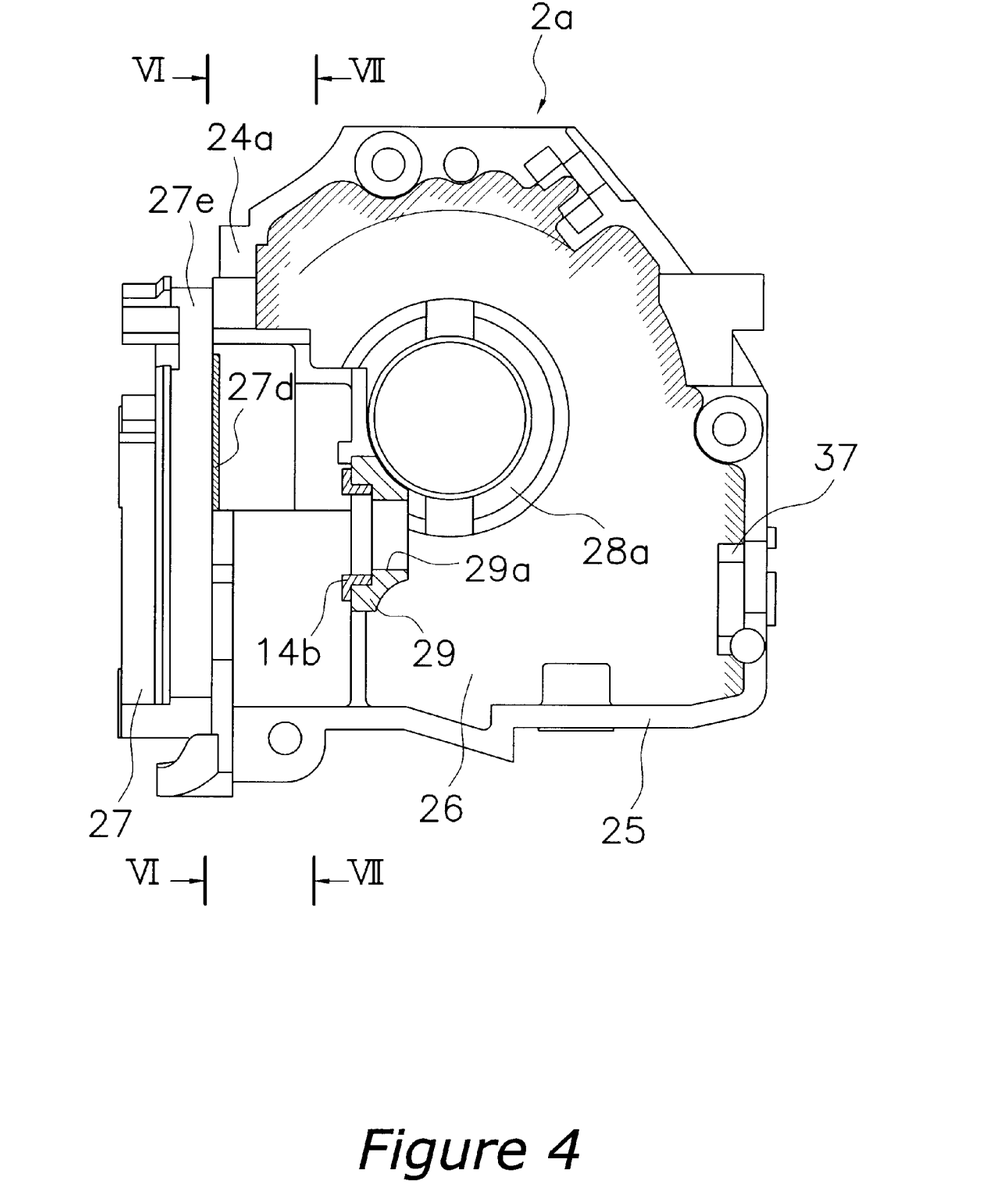
FIG. 4 is a side view of the casing according to the embodiment of the present invention.
Figure 5:
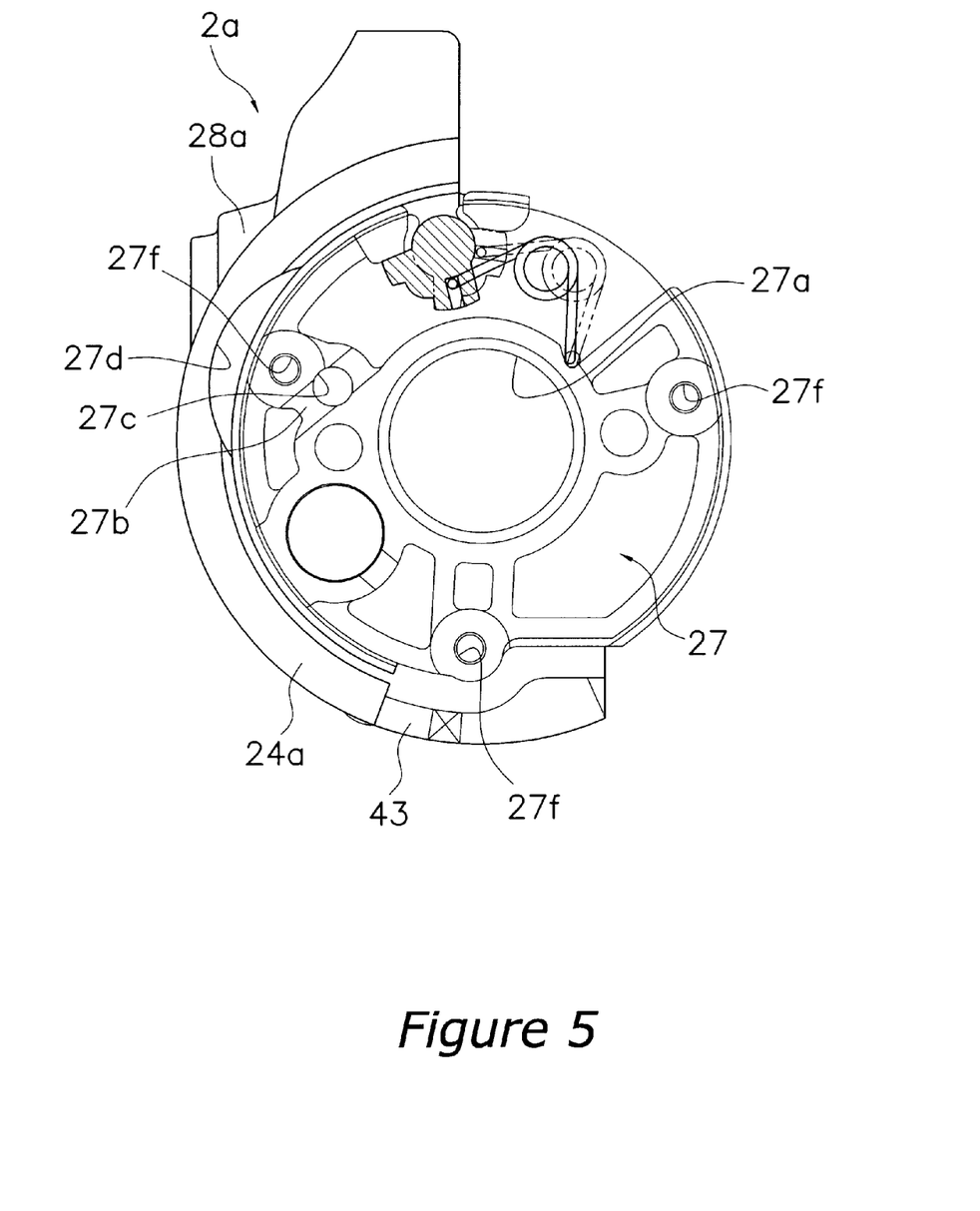
FIG. 5 is a front view of the casing according to the embodiment of the present invention.

The casing 2a is made of, for example, a polyamide-based synthetic resin reinforced by glass fibers and is fabricated by injection molding. As shown in FIGS. 3 to 5, the casing 2a has: an opening 25 formed in the side portion thereof; a mechanism accommodating space 26 formed inside; a rotation support portion 27 that is formed to be arranged in a circular hollow 3a (FIG. 2) that is formed at the reel unit 2 side of the rotor 3 for rotatably supporting the rotation shaft (a later-described pinion gear 12) of the rotor 3; and a first handle support portion 28a formed of a boss for supporting one end of a handle shaft 10, which is the rotation shaft of the handle 1. The upper portion (the portion near the mounting side of a fishing rod) of the casing 2a has about half the thickness of the reel unit 2, but the lower portion bulges towards the lid portion 2b and is formed with a thickness greater than that of the upper portion.

Figure 7:
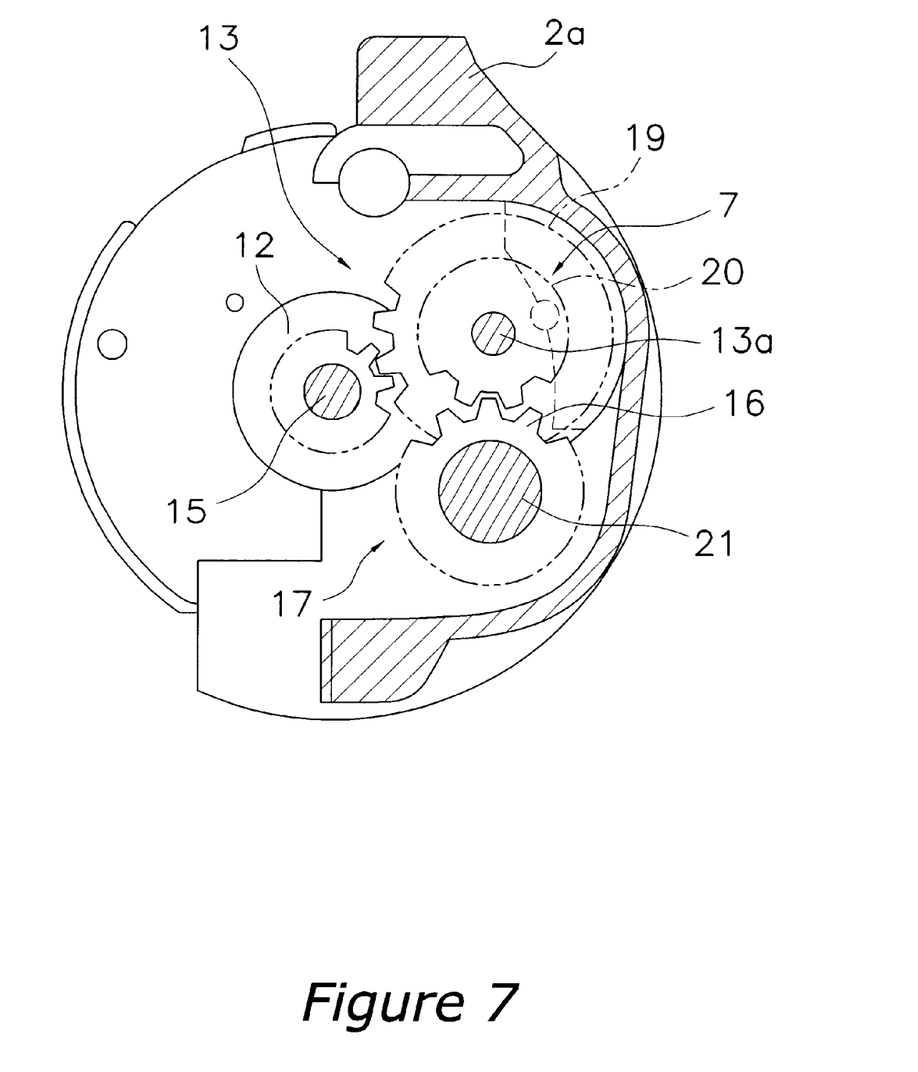
FIG. 7 is a cross-sectional view of the casing according to the embodiment of the present invention taken along line VII—VII of FIG. 4.

In order to accommodate various mechanisms in the mechanism accommodating space 26, the openings 25 are provided in three portions, namely the upper, the lower, and the rear portions, but not in the front portion. The mechanism accommodating space 26 accommodates a rotor driving mechanism 5, an oscillation mechanism 6, and a power transmission mechanism 7 (FIGS. 2 and 7). The rotor driving mechanism 5 rotates the rotor 3. The oscillating mechanism 6 is for winding up the fishing line uniformly by moving the spool 4 back and forth. The power transmission mechanism 7 transmits rotation of the handle 1 to the oscillating mechanism 6.

The rotation support portion 27 is formed unitarily with the front portion of the first semi-circular flange portion 24a that is formed unitarily into a substantially columnar shape in front of the mechanism accommodating space 26. The rotation support portion 27 has a through hole 27a (FIG. 2) through which the pinion gear 12 passes. A one-way clutch 51 is screwed fast on the front face of the rotation support portion 27.

As shown in FIG. 5, a shaft-extracting hollow 27b for extracting a gear shaft 13a that is for mounting a later-described dual-stepped gear 13 of the power transmission mechanism 7 is formed at the front face of the rotation support portion 27. The shaft-extracting hollow 27b is formed at opposing locations near a mounting hole 27c for mounting the gear shaft 13a. This makes it possible to extract the gear shaft 13a protruding from the mounting hole 27c by pinching the fore-end thereof with a tool such as a pincer. The portion of the rotation support portion 27 that overlaps with the first flange portion 24a has a mounting opening 27d formed therein in order to secure the mounting space for the dual-stepped gear 13 and to shorten the dimension of the casing 2a with respect to the spool shaft direction. The mounting opening 27d is formed from the rear face side of the rotation support portion 27 in order to bring forward the mounting space for the dual-stepped gear 13.

Figure 6:
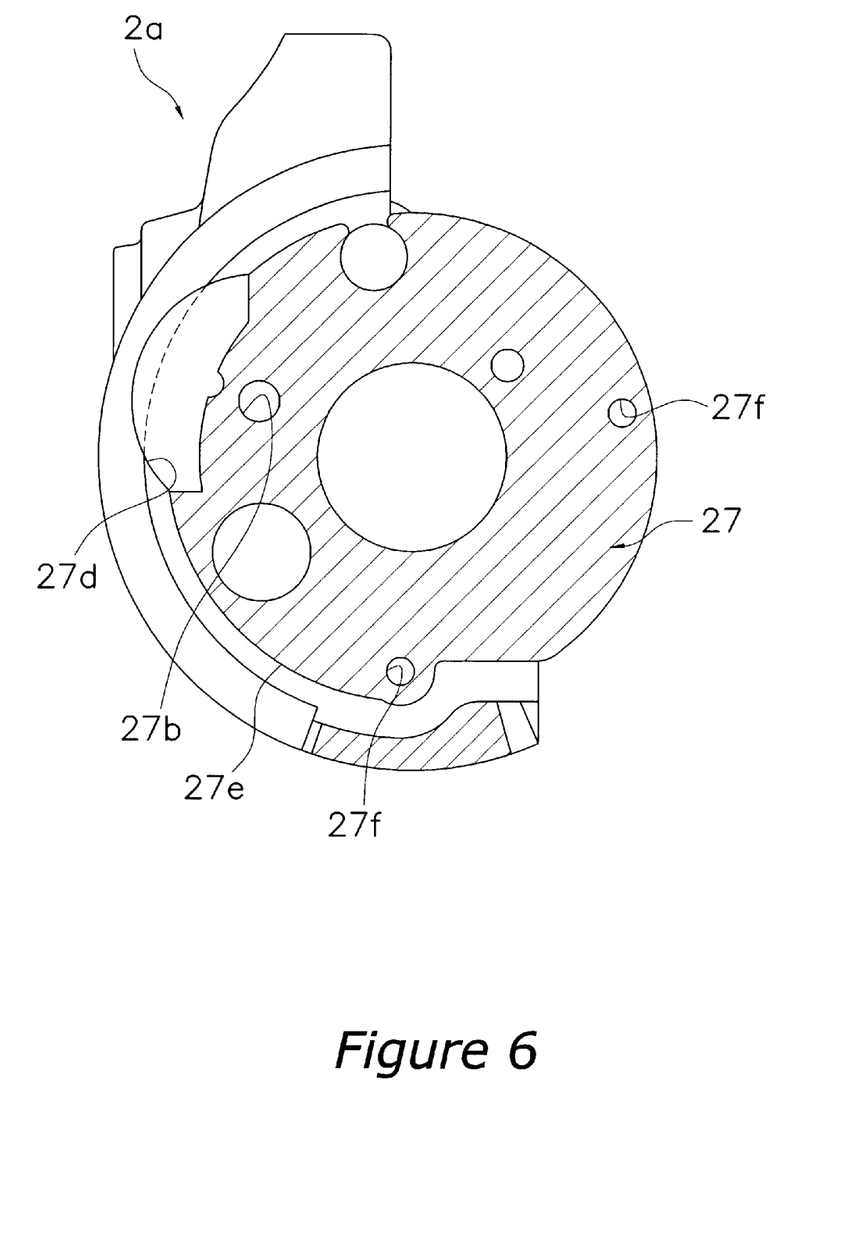
FIG. 6 is a cross-sectional view of the casing according to the embodiment of the present invention viewed along line VI—VI of FIG. 4.

Referring to FIG. 6, at the first flange portion 24a side of the rotation support portion 27, an annular groove 27e is formed for mounting a brake member 55 of a later-described rotor braking mechanism 54. The annular groove 27e is formed radially outward with respect to screw holes 27f for attaching a later-described one-clutch 51. Conventionally, the annular groove 27e has been formed radially inward from the screw holes, and for that reason, it has been necessary that the dimension of the casing 2a with respect to the spool shaft direction be determined so that the screw holes 27f do not interfere with the annular groove 27e. By contrast, when it is formed radially outward of the screw holes 27f for mounting the one-way clutch 51, the need for taking into consideration the interference between the screw holes 27f and the annular groove 27e is eliminated, and the dimension with respect to the spool shaft direction can be further shortened.

The lid portion 2b is made, for example, by die-casting an aluminum alloy. As shown in FIGS. 2 and 3, the lid portion 2b includes a thin-walled cover portion 35 covering the opening 25 of the casing 2a, and a mounting leg portion 36 extending upward from the cover portion 35. The upper portion of the cover portion 35 is formed at about half the thickness of the reel unit 2, and the lower portion becomes thinner as the casing 2a bulges toward it. At the front of the cover portion 35, a substantially semi-circular second flange portion 24b of the flange portion 2c is formed. A second handle support portion 28b including a boss portion for supporting the other end of the handle shaft 10 is formed on one side of the cover portion 35.

The mounting leg portion 36 is a solid, thick-walled member, one end of which extends both frontward and backward and forms a rod-mounting portion 36a. The boundary portion between the cover portion 35 and the mounting leg portion 36 is cut out at approximately half the thickness, and the upper portion of the casing 2a is inserted into the cut-out portion so that the outer side faces are smoothly connected.

The flange portion 2c is formed into a disk-like shape and arranged in substantially the same plane as the edge face of the circular hollow 3a formed in the rear of the rotor 3, thus covering the circular hollow 3. As mentioned previously, the flange portion 2c has the substantially semi-circular first flange portion 24a, which is formed unitarily with the casing 2a, and the semicircular second flange portion 24b, which is formed unitarily with the cover portion 35 of the lid portion 2b and forms a circle together with the first flange portion 24a. Since these flange portions 24a and 24b are thus formed unitarily with the casing 2a and the cover portion 35 respectively, the relative strength of the casing 2a and the cover portion 35 can be maintained at a high level. In addition, deformations during the molding can be prevented and high precision can be maintained.

Rotor Configuration

The rotor 3, as shown in FIG. 2, includes a cylindrical portion 30 having an opening at the rear end to form a hollow 3a, and first and second rotor arms 31 and 32 opposing each other provided on the sides of the cylindrical portion 30. The cylindrical portion 30 and the two rotor arms 31 and 32 are formed unitarily.

The cylindrical portion 30 is arranged on the outer peripheral side of the rotation support portion 27 of the casing 2a. The hollow 3a of the cylindrical portion 30 is covered by the flange portion 2c. A front wall 33 is formed at a front portion of the cylindrical portion 30, and a boss 33a is formed at the center of the front wall 33. A front portion 12c of the pinion gear 12 and the spool shaft 15 are passed through a through hole in the boss 33a. A nut 34 is disposed at the front of the front wall 33, and this nut 34 fastens the rotor 3 to the pinion gear 12 by being screwed to a male threaded portion formed at the front end 12a of the pinion gear 12.

To the fore-ends of the first and the second rotor arms 31 and 32, a bail arm 45 for guiding a fishing line to the spool 4 is mounted so that the bail arm 45 can pivot between a line winding posture and a line releasing posture. The bail arm 45 is returned from the line-releasing posture to the line-winding posture by a bail tripping mechanism 40 that is mounted inside the first rotor arm 31, in cooperation with the rotation of the handle 1 in the line-winding direction. The bail tripping mechanism 40 includes a shifting member 41 that is engaged with the bail arm 45 at its one end so as to be movable front and rear in the first rotor arm 31; a toggle spring mechanism 42 that toggles and biases the bail arm 45 into the line-winding position and the line-releasing position; and a switching protrusion 43 that is provided at the front face of the rotation support portion 27. The shifting member 41 is guided by the first rotor arm 31 so as to be movable front and rear, contacting and releasing the reel unit 2. The shifting member 41 is made of a wire, and the opposing ends thereof are bent in opposing directions. The switching protrusion 43 is formed protruding forward at the front portion of the rotation support portion 27. The rotor 3 is provided with a rotor braking mechanism 54 for braking the rotor 3 using the bail tripping mechanism 40. The rotor braking mechanism 54 includes the above-described shifting member 41 and a braking member 55 made of rubber, which contacts the fore-end of the shifting member 41 when in the line-releasing posture. When the bail arm 45 is pivoted into the line-releasing posture, the shifting member 41 retreats and contacts the braking member 55, and thus the rotor braking mechanism 54 brakes the rotor 3. The braking member 55 is mounted to the annular groove 27e as described above. The position of mounting is located more radially outward than in conventional reels.

A reverse rotation prevention mechanism 50 for preventing reverse rotation of the rotor 3 is disposed inside the hollow 3a. The reverse rotation prevention mechanism 50 has a roller-type one-way clutch 51 and an operation mechanism 52 for switching the one-way clutch 51 between an operative state and a non-operative state. An outer ring of the one-way clutch 51 is fixed to the casing 2a, and an inner ring thereof is fixed non-rotatably to the pinion gear 12. The operation mechanism 52 includes an operation lever 53 mounted to the rear of the casing 2a. The one-way clutch can be shifted between the two states by pivoting the operation lever 53. In the operative state, reverse rotation of the rotor 3 is not possible, whereas in the non-operative state, reverse rotation of the rotor 3 is possible.

Spool Configuration

The spool 4 is arranged between the first rotor arm 31 and the second rotor arm 32 of the rotor 3, and is fastened to the front end of the spool shaft 15 with the drag mechanism 60 interposed between the spool shaft 15 and the spool 4. The spool 4 is a member made of, for example, an aluminum alloy, and includes a bobbin trunk portion 4a onto the outer periphery of which fishing line is wound, a skirt portion 4b formed unitarily with the rear of the bobbin trunk portion 4a, and a front flange portion 4c attached to the front of the bobbin trunk portion 4a. The bobbin trunk portion 4a is a cylindrical member extending toward the outer peripheral side of the cylindrical portion 30 of the rotor 3. The skirt portion 4b and the front flange portion 4c extend vertically and radially outward from either end of the bobbin trunk portion 4a. Thus, when fishing line is wound around the bobbin trunk portion 4a of the spool 4, the number of the winds of the fishing line becomes approximately the same across the steps of the winds.

Configuration of Rotor Driving Mechanism

As shown in FIGS. 2 and 3, the rotor driving mechanism 5 includes a main gear shaft 10, a main gear 11 and a pinion gear 12. The main gear 11 rotates together with the main gear shaft 10, on which the handle 1 is mounted non-rotatably. The pinion gear 12 meshes with the main gear 11. The pinion gear 12 is a hollow tubular member made of metal. The pinion gear 12, which rotates when the handle is turned, is pierced by the horizontally extending spool shaft 15. The middle and the rear of the pinion gear 12 are supported rotatably with bearings 14a and 14b by the casing 2a. The rotor 3 is mounted non-rotatably to the front end 12a of the pinion gear 12. The bearing 14a on the front side is a ball bearing mounted to the inside of the rotation support portion 27. The bearing 14b on the rear side is a brimmed bushing, as shown in FIG. 4, and is mounted to a bearing supporting portion 29 formed in the casing 2a. The bearing supporting portion 29 has a stepped hole 29a formed therein, and the bearing 14b is mounted on the larger-diameter side of the stepped hole. Thus, since the bearing supporting portion 29 is formed with the stepped hole 29a, the wall thickness of the bearing supporting portion can be made large, and the relative strength of the bearing supporting portion 29 can be increased.

Oscillating Mechanism Configuration

The oscillating mechanism 6 reciprocates the spool 3 back and forth with the spool shaft 15 in response to a rotation of the handle 1. The rotation of the handle 1 is transmitted to the oscillating mechanism 6 via a power transmission mechanism 7. As shown in FIGS. 3 and 7 to 9, the oscillating mechanism 6 has a threaded shaft 21 that is arranged below the gear shaft 13a, a slider 22 that is shiftable front and rear along the threaded shaft 21, and two guide shafts 47a and 47b that guide the slider 22.

The threaded shaft 21 is arranged parallel to the spool shaft 15. Both ends of the threaded shaft 21 are rotatably supported by the casing 2a. The rear end of the threaded shaft 21 is supported by a bearing (not shown) that is mounted to a thick-wall portion 37, which is formed at the rear of the casing 2a. Thus, since only the portion of the casing 2a that supports the bearing has a thick wall in this way, it is possible to reduce the weight of the casing 2a and prevent sink marks during molding. In addition, a groove 21a of an intersecting spiral contour is formed on the outer peripheral portion of the threaded shaft 21. The lead angle θ of the groove 21a is set at 20 to 45 degrees. The lead angle θ of the groove 21a is an angle given by the following equation:

$$\text{Lead angle } \theta = \text{arc cot}(\pi D/L),$$

where D is the bottom diameter of the groove 21a and L is the lead of the threaded shaft 21, which is the distance that groove advances in the shaft direction in a single turn of the threaded shaft 21. When the lead angle θ is less than 20 degrees, the wall thickness between the grooves is small and the number of crossing points increases which is not preferable. When the lead angle θ is greater than 45 degrees, the efficiency of converting rotational motion into linear motion is reduced, which is also not preferable.

Referring to FIG. 3, the slider 22 has a slider unit 48 and an engaging member 49 that is enclosed in the slider unit 48. The slider unit 48 is guided parallel to the spool shaft 15 by the guide shafts 47a and 47b. The engaging member 49 is mounted rotatably in the slider unit 48, and the front end of the engaging member 49 meshes with the groove 21a of the threaded shaft 21.

Configuration of Power Transmission Mechanism

The power transmission mechanism 7 has, as shown in FIGS. 2 and 3 and FIGS. 7 to 9, a helical-tooth pinion gear 12, serving as a drive gear, a dual-stepped gear 13 that meshes with the pinion gear 12, and a straight-tooth driven gear 16 that meshes with the dual-stepped gear 13.

The dual-stepped gear 13 is made of a synthetic resin such as a polyamide-based synthetic resin or a polyacetal resin. The dual-stepped gear 13 is provided to greatly decelerate the rotation of the pinion gear 12 and transmit the decelerated rotation to the driven gear 16. A gear shaft 13a passes through the center of the dual-stepped gear 13. The gear shaft 13a is arranged above the threaded shaft 21 in a rear space of the rotation support portion 27. Thus, when the gear shaft 13a, which is the central axis of the dual-stepped gear 13, is arranged above the threaded shaft 21, the dimension of the reel unit 2 with respect to the vertical direction can be shortened. The gear shaft 13a is supported rotatably in the reel unit 2 via a bearing 18a mounted in the mounting hole 27c of the rotation support portion 27 and a bearing 18b (FIG. 9) mounted to the casing 2a. The dual-stepped gear 13 has larger and smaller gears, which are a larger-diameter helical-tooth gear 19 that meshes with the pinion gear 12 and a smaller-diameter straight-tooth gear 20 that meshes with the driven gear 16 and is formed unitarily with the larger-diameter gear 19. The smaller-diameter gear 20 is arranged coaxially with the larger-diameter gear 19. The driven gear 16 is made of a synthetic resin, and is mounted non-rotatably to the front end of the threaded shaft 21.

When the dual-stepped gear 13 having these two gears 19 and 20 is used to decelerate the rotation, deceleration can be done by a gear having a simple structure and the spool 4 can be reciprocated front and rear at low speed. Therefore, it is not necessary to use a special gear, and an increase in manufacturing cost can be suppressed. In addition, the rotational axis of the dual-stepped gear 13 and the rotational axes of the pinion gear 12 and the driven gear 16 can be arranged parallel to each other, and consequently, machining precision can be easily ensured. Moreover, because the dual-stepped gear 13 is arranged in the front portion of the casing 2a, it is unnecessary to increase the width of the reel unit 2, even when deceleration is attained by using the dual-stepped gear 13 having the larger-diameter gear 19, which requires a relatively large space with respect to the width direction (left to right direction). Thus, a compact reel is realized. In addition, the larger-diameter gear 19 has helical teeth whereas the smaller-diameter gear 20 has straight teeth, and therefore, by dividing the mold at the boundary portion between the gears 19 and 20, it is easy to make the dual-stepped gear 13 from a synthetic resin. Thus, the manufacturing cost can be reduced while noise is suppressed.

Figure 8:
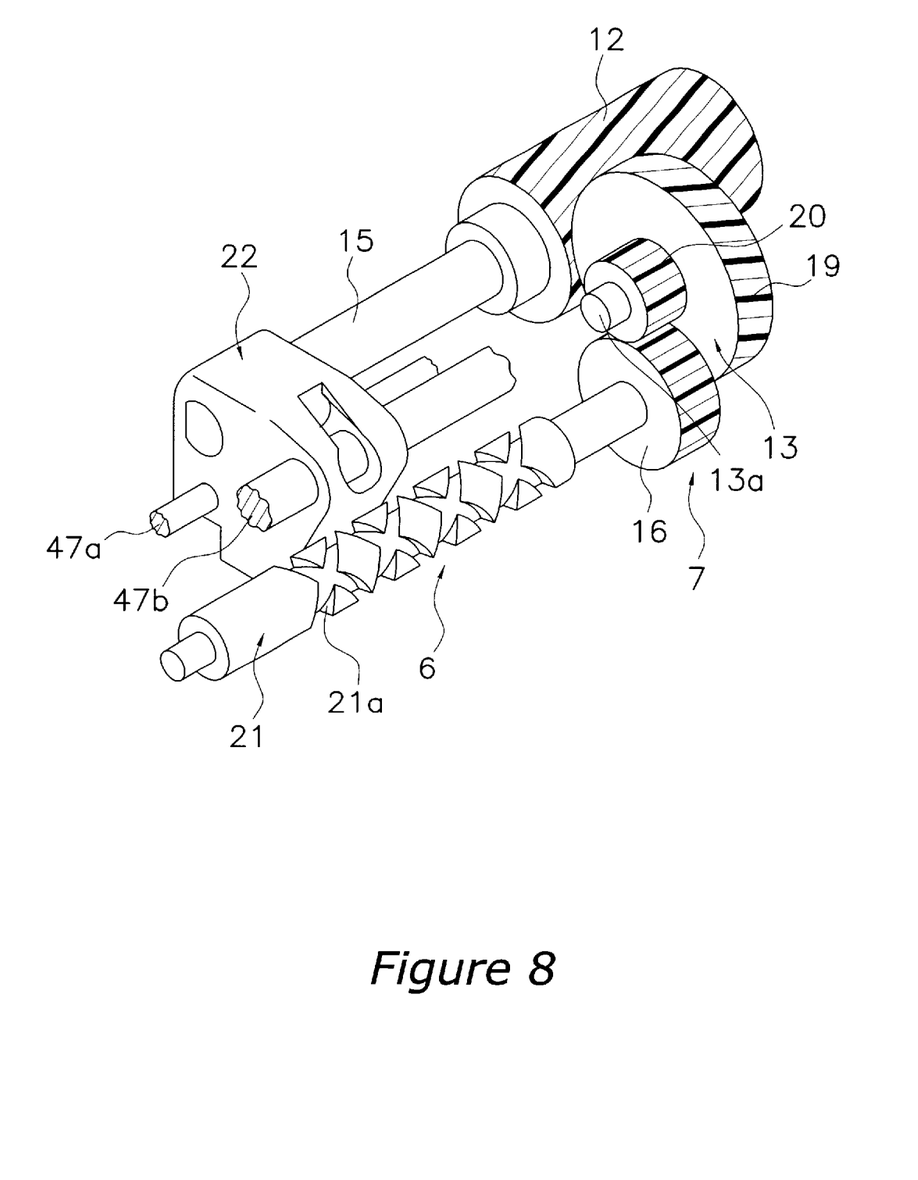
FIG. 8 is a perspective view of the oscillating mechanism according to the embodiment of the present invention.
Figure 9:
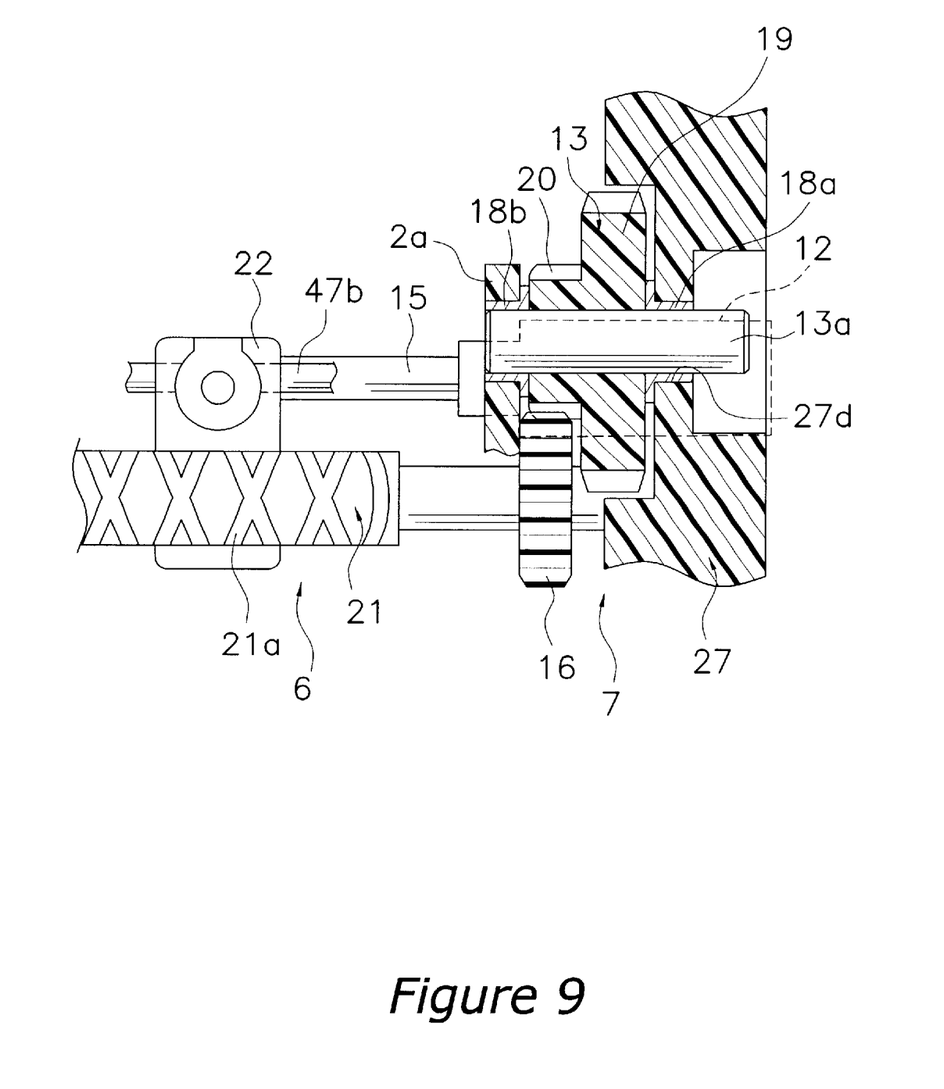
FIG. 9 is a cross-sectional view of the oscillating mechanism according to the embodiment of the present invention.

The number of teeth of the pinion gear 12 is, for example, 8, and the number of teeth of the larger-diameter gear 19 is 16. The number of teeth of the smaller-diameter gear 20 is 5, and the number of teeth of the driven gear 16 is 15. Accordingly, the gear-down ratio, which is the ratio of the rotational speed of the threaded shaft 21 to the rotational speed of the pinion gear 12, is: (½)×(5/15)=⅙. It is preferable that the reduction gear ratio is within the range of ¼ to 1/24. If the reduction gear ratio is greater than ¼, the axial speed of the spool 4 becomes too fast and the effect of densely packing the fishing line onto the spool 4 cannot be obtained sufficiently. If it exceeds 1/24, the axial speed of the spool 4 becomes too slow and a fishing line can be wound twice in one turn of the rotor 3, even with a thin fishing line. It should be noted that FIGS. 7 through 9 are not meant to show actual numbers of teeth of the gears.

When casting this spinning reel, the bail arm 45 is toppled from the line-winding posture to the line-releasing posture. Then, the fishing rod is swung and the tackle is cast out. Thus, fishing line is released in a helical fashion from the front end of the spool 4. At this time, because the fishing line is densely packed on the spool 4, the releasing resistance is small.

When taking up the fishing line, the bail arm 45 is toppled into the line-winding posture. This happens automatically by the functioning of a cam and a spring, which are not shown in the drawings, when the handle 1 is rotated in the line-winding direction. When the handle 1 is rotated in the line-winding direction, the rotational force is transmitted via the main gear shaft 10 and the main gear 11 to the pinion gear 12. The rotational force transmitted to the pinion gear 12 is transmitted to the rotor 3 via the front portion 12a of the pinion gear 12, and the rotor 3 is rotated in the line-winding direction.

Meanwhile, the dual-stepped gear 13 is rotated by the larger-diameter gear 19, which meshes with the pinion gear 12, and the rotation is transmitted to the driven gear 16 via the smaller-diameter gear 20. As a result, the threaded shaft 21 rotates at a rotational speed of ⅙ of the rotational speed of the pinion gear 12 (the rotational speed of the rotor 3). Then, with the rotation of the worm gear 21, the slider 22, which meshes with the groove 21a on the threaded shaft 21, reciprocates back and forth, guided by the guide shafts 47a and 47b. The fishing line guided by the bail arm 45 to the spool 4 is wound onto the bobbin trunk portion 4a of the spool 4, and the fishing line is densely packed onto the spool 4. Thus, the fishing line is efficiently wound onto the spool 4.

Figure 10:
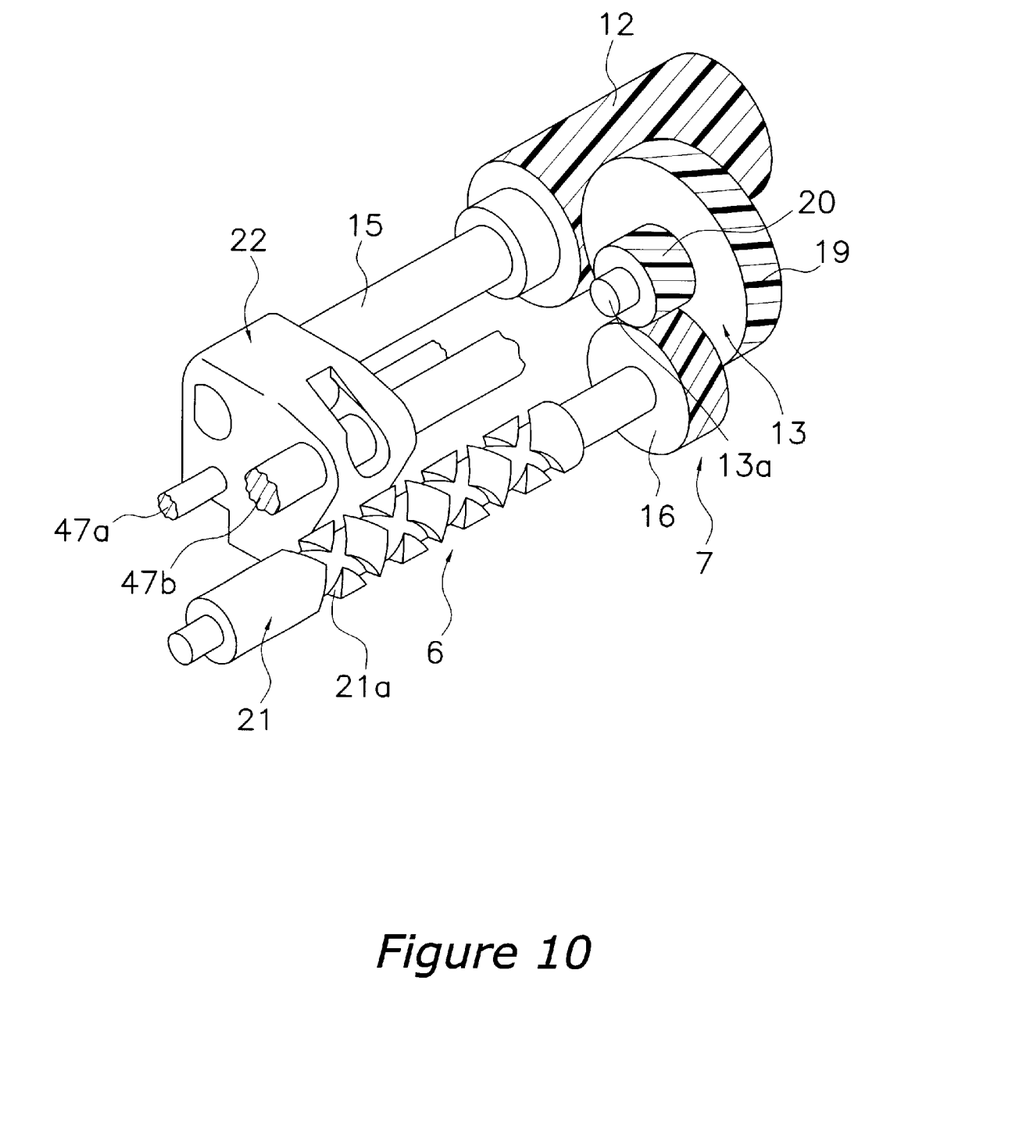
FIG. 10 is a view of the oscillating mechanism according to another embodiment of the present invention.

OTHER EMBODIMENTS (a) In the foregoing embodiment, the smaller-diameter gear 20 is a straight-tooth gear, but it may be configured by a helical-tooth gear whose orientation is substantially the same as that of the larger-diameter 19. If this is the case, in order for the mold to have a simple configuration, it is preferable that the specifications of the gears 19 and 20 are defined in the following relationship:

$$M1 \times Z1/\sin \alpha = M2 \times Z2/\sin \beta,$$

where the normal module of the larger-diameter gear 19 is M1, the number of teeth thereof is Z1, the helical tooth angle of the helical teeth thereof is $\alpha$, the normal module of the smaller-diameter gear 20 is M2, the number of teeth thereof is Z2, and the helical tooth angle of the helical teeth thereof is $\beta$. With this configuration, the leads of the two gears 19 and 20 match when they are detached from the metal mold and the two gears 19 and 20 can be easily formed in a single metal mold. It should be noted that, in this case, noise can be suppressed even when the dual-stepped gear is not made of a synthetic resin but is formed of metal using metal molding such as die-casting and sintering.

(b) In the foregoing, a front-drag type spinning reel was illustrated as an example, but the present invention can also be applied to an oscillating mechanism in a rear-drag type spinning reel. If this is the case, the spool shaft is rotatably, but non-movably with respect to the axis direction, connected with the slider. In addition, the present invention can be applied to oscillating mechanisms in a lever-brake type spinning reel and in an in-spool type spinning reel.

(c) In the foregoing, the gear shaft 13a is arranged above the worm gear 21, but the gear shaft 13a may be arranged below the worm gear 21. If this is the case, the width of the reel unit can be reduced.

(d) In the foregoing, a power transmission mechanism that transmits power to the oscillating mechanism 6 was illustrated as an example, but the present invention can be applied to any device for transmitting power to a rotating portion in a fishing reel, such as a level wind mechanism in a dual-bearing reel.

The present invention makes it possible to obtain a dual-stepped gear in which two gear portions are unitarily formed with each other by determining the two gear portions of the dual-stepped gear or by making the second gear portion with straight teeth. Thus, in a power transmission device of a fishing reel, when both gear portions have helical teeth, it is possible to reduce the manufacturing cost while suppressing noise irrespective of their materials, whereas when the second gear portion has straight-teeth, it is possible to reduce the manufacturing cost while suppressing noise by making the dual-stepped gear from a synthetic resin.

As used herein, the following directional terms "forward," "rearward," "above," "downward," "vertical," "horizontal," "below," and "transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2002-026848. The entire disclosure of Japanese Patent Application No. 2002-026848 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A fishing-reel power transmission device transmitting power from a first rotatable member to a second member in a fishing reel, comprising:

a drive gear that rotates in cooperation with the first rotatable member;

a dual-stepped gear having a first gear portion and a second gear portion, said first gear portion having a helical-tooth gear and meshing with said drive gear, said second gear portion being arranged coaxially with said first gear portion, said first gear portion and said second gear portion being formed as a one-piece unitary member, said second gear portion having either of a straight-tooth gear and a helical-tooth gear whose orientation is substantially the same as an orientation of said first gear portion; and a driven gear that meshes with said second gear portion of said dual-stepped gear to rotate the second member.

2. The fishing-reel power transmission device as set forth in claim 1, wherein said dual-stepped gear is made of a synthetic resin.

3. The fishing-reel power transmission device as set forth in claim 1, wherein said first gear portion has a larger diameter than said second gear portion.

4. The fishing-reel power transmission device as set forth in claim 1, wherein said drive gear is made of metal, and
said driven gear is made of a synthetic resin.

5. The fishing-reel power transmission device as set forth in claim 4, wherein said second gear portion and said driven gear are straight-tooth gears.

6. The fishing-reel power transmission device as set forth in claim 1, wherein a number of teeth of said drive gear is less than a number of teeth of said first gear portion, and a number of teeth of said second gear portion is less than a number of teeth of said driven gear.

7. The fishing-reel power transmission device as set forth in claim 1, wherein said second gear portion has a helical-tooth gear whose orientation is substantially the same as said first gear portion, such that $$M1 \times Z1/\sin \alpha = M2 \times Z2/\sin \beta$$

where M1 is a normal module of said first gear portion, Z1, is a number of teeth of said first gear portion, $\alpha$ is an angle of the helical teeth of said first gear portion, M2 is a normal module of said second gear portion, Z1 is a number of teeth of said second gear portion, β is an angle of the helical teeth of said second gear portion.

8. The fishing-reel power transmission device as set forth in claim 1, wherein the fishing reel is a spinning reel, with the first member being a handle and a rotor that is mounted rotatably to a reel unit, the rotor guiding a fishing line by rotating in cooperation with rotation of the handle, the rotor winding the fishing line to a spool that reciprocates back and forth in cooperation with rotation of the handle via an oscillating mechanism having the second member being a worm gear, said drive gear is a pinion gear to which the rotor is mounted non-rotatably, said pinion gear meshing with a master gear provided on a rotation shaft of the handle;

said driven gear is provided on the worm gear; and the first gear portion meshes with said pinion gear.

9. A spinning reel, comprising:

a handle;

a reel unit that rotatably supports said handle;

a rotor rotatably supported at a front of said reel unit;

a spool arranged at a front of said rotor, said rotor winding a fishing line on an outer periphery of said spool;

an oscillating mechanism that has a threaded shaft and reciprocates said spool back and forth in response to a rotation of said handle with a spool shaft that is coupled to said threaded shaft;

a power transmission mechanism which transmits the rotation of said handle to said oscillating mechanism, said power transmission mechanism including
   a pinion gear that rotates in cooperation with said handle;
   a dual-stepped gear having a first gear portion and a second gear portion, said first gear portion having a helical-tooth gear and meshing with said drive gear, said second gear portion being arranged coaxially with said first gear portion, said first gear portion and said second gear portion being formed as a one-piece unitary member, said second gear portion having one of a straight-tooth gear and a helical-tooth gear whose orientation is substantially the same as an orientation of said first gear portion; and
   a driven gear that meshes with said second gear portion of said dual-stepped gear to rotate one of said rotor and said oscillating mechanism.

10. The spinning reel as set forth in claim 9, wherein said dual-stepped gear is made of a synthetic resin.

11. The spinning reel as set forth in claim 9, wherein said first gear portion has a larger diameter than said second gear portion.

12. The spinning reel as set forth in claim 9, wherein said pinion gear is made of metal, and said driven gear is made of a synthetic resin.

13. The spinning reel as set forth in claim 12, wherein said second gear portion and said driven gear are straight-tooth gears.

14. The spinning reel as set forth in claim 9, wherein a number of teeth of said pinion gear is less than a number of teeth of said first gear portion, and a number of teeth of said second gear portion is less than a number of teeth of said driven gear.

15. The spinning reel as set forth in claim 9, wherein said second gear portion has a helical-tooth gear whose orientation is substantially the same as said first gear portion, such that $$M1 \times Z1/\sin \alpha = M2 \times Z2/\sin \beta$$

where M1 is a normal module of said first gear portion, Z1 is a number of teeth of said first gear portion, α is an angle of the helical teeth of said first gear portion, M2 is a normal module of said second gear portion, Z1 is a number of teeth of said second gear portion, β is an angle of the helical teeth of said second gear portion.

* * * * *